(12) United States Patent
Awasa (10) Patent No.: US 8,864,160 B2
(45) Date of Patent: Oct. 21, 2014

(54) FRONT FORK (71) Applicant: Showa Corporation, Gyoda (JP)

(72) Inventor: Shigeki Awasa, Hukuroi (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 13/762,466

(22) Filed: Feb. 8, 2013

(65) Prior Publication Data
US 2013/0320647 A1 Dec. 5, 2013

(30) Foreign Application Priority Data

May 31, 2012 (JP) .................. 2012-123926

(51) Int. Cl.
B62K 21/02 (2006.01)
F16F 9/48 (2006.01)
B62M 25/08 (2006.01)

(52) U.S. Cl.
CPC ................ B62K 21/02 (2013.01); B62M 25/08 (2013.01)
USPC ............ 280/276; 280/279; 188/276; 188/277

(58) Field of Classification Search
CPC ........ B62K 11/12; B62K 21/02; B62K 21/20; B62K 25/04; B62K 25/06; B62K 25/08; B62K 2025/02
USPC ............... 180/219; 188/266.1, 276, 277, 280; 280/5.515, 276, 277, 279, 280
See application file for complete search history.

(56) References Cited

U.S. PATENT DOCUMENTS

| | | | |
|---|---|---|---|
| 4,673,067 A * | 6/1987 | Munning et al. | 188/266.4 |
| 5,211,420 A | 5/1993 | Iwashita | |
| 6,032,961 A * | 3/2000 | Pradel et al. | 280/5.514 |
| 7,124,865 B2 * | 10/2006 | Turner et al. | 188/322.2 |
| 8,684,367 B2 * | 4/2014 | Haugen | 280/5.515 |
| 2010/0010709 A1 | 1/2010 | Song | |
| 2010/0066051 A1 | 3/2010 | Haugen | |

FOREIGN PATENT DOCUMENTS

| | | |
|---|---|---|
| DE | 19548721 A1 | 7/1997 |
| DE | 102010036443 A1 | 1/2011 |
| EP | 1886912 A1 | 2/2008 |
| EP | 2338777 A1 | 6/2011 |

OTHER PUBLICATIONS

Alain Gaillard, European Search Report, Counterpart Application, Jul. 5, 2013, Munich, Germany.

* cited by examiner

Primary Examiner — Joseph M Rocca
Assistant Examiner — Marc A Scharich
(74) Attorney, Agent, or Firm — Babcock IP, PLLC (57) ABSTRACT A front fork in which a stroke amount of a spring leg that relies on an air spring can be detected precisely, wherein pressure leaks in the spring leg are detectable. The front fork has: a guide cylinder that extends from one of a vehicle body-side tube or an axle-side tube that make up a spring leg; a piston mounted to the leading end of a guide rod extending from the other one of the tubes; an inner airspring chamber in the interior of the guide cylinder; an outer airspring chamber, outward of the inner airspring chamber, in the interior of the vehicle body-side tube and the axle-side tube; first and second detectors for detecting pressure and temperature in the outer airspring chamber the inner airspring chamber, respectively; and stroke detection compensator for detecting a stroke amount on the basis of outputs of the first and second detectors.

4 Claims, 8 Drawing Sheets

FRONT FORK

CROSS-REFERENCES TO RELATED APPLICATIONS

This is application claims the benefit of Japan Patent Application No. 2012-123926 filed on May 31, 2012 with the Japanese Patent Office, the entire contents of which are hereby incorporated by reference in the entirety.

TECHNICAL FIELD

The present invention relates to a front fork, and more particularly, to a front fork for motorcycles in which an air spring is used as a spring.

BACKGROUND

Figure 8:
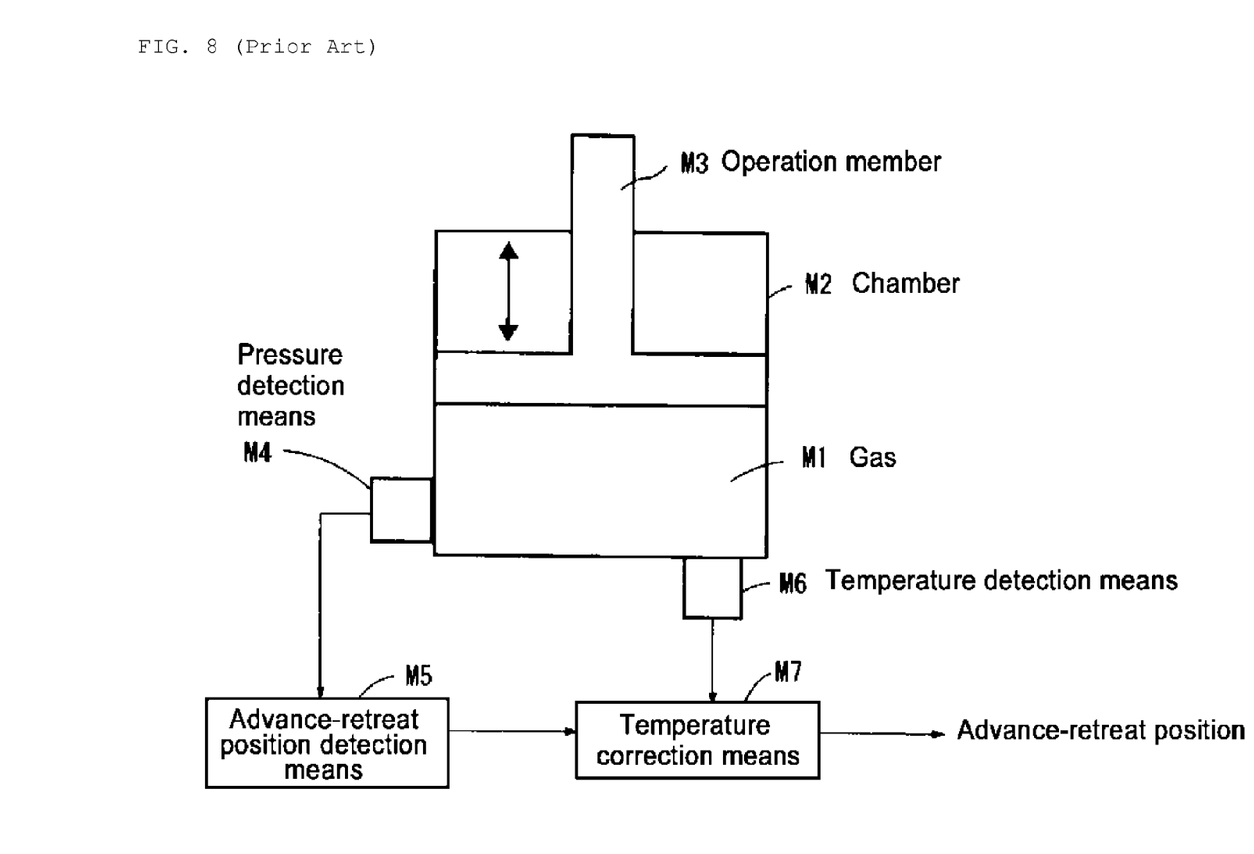
FIG. 8 is a schematic configuration diagram of a conventional spring leg.

In a conventional advance-retreat position detection device disclosed in Japanese Unexamined Utility Model Application Publication No. H3-42706 and illustrated in FIG. 8, herein, focusing on the change in pressure of a gas M1 in a chamber M2 in accordance with an advance-retreat position of an operating member M3 in the chamber M2, the abovementioned pressure is detected by a pressure detector M4, and, thereby, the advance-retreat position of an operation member M3 is detected by an advance-retreat position detector M5; and focusing on the influence that high temperature in the chamber M2 exerts on the abovementioned pressure, temperature detector M6 detects that temperature, and a temperature corrector M7 corrects the temperature at the advance-retreat position of the operation member M3 on the basis of the temperature output, so that an accurate stroke amount is detected as a result.

Known front fork suspensions include suspensions in which front forks are disposed on the left and right, each front fork being configured in the form of a mechanical spring and a damper integrated with each other, and also suspensions in which the functions of the spring and the damper are divided between the left and right front forks.

The springs used in front forks of the latter type include mechanical coil springs and air springs.

Front forks that utilize air springs are configured in the form of two air spring chambers, namely an outer air spring chamber comprising an inner space of a vehicle body-side (first) tube and an inner space of an axle-side (second) tube, and an inner air spring chamber that is partitioned, from the outer air spring chamber, through sliding of a piston, which is mounted to the vehicle body-side tube, within a guide cylinder that is provided in the axle-side tube. The volume of the outer air spring chamber increases or decreases as a result of changes in the total length of the vehicle body-side tube and the axle-side tube accompanying the stroke operation of the suspension, while the volume of the inner air spring chamber increases or decreases as a result of displacement of the piston within the guide cylinder. The air in the air spring chambers undergoes repeated compression and expansion as a result of the abovementioned volume increases or decreases. This compression and expansion of air translates into rises in the temperature in the air spring chambers, as well as rises in the pressure in the air spring chambers on account of the increases in temperature. These rises and drops in the pressure in the air spring chambers that accompany rises in temperature may alter the designed functionality of the air spring, and may detract from the suspension effect in the vehicle. Therefore, it would be conceivable, on the basis of Japanese Unexamined Utility Model Application Publication No. H3-42706, to measure the temperature and/or pressure in the outer air spring chamber and to use an advance-retreat position detection device that adjusts the stroke amount according to changes in the temperature and/or pressure.

In the advance-retreat position detection device of Japanese Unexamined Utility Model Application Publication No. H3-42706, however, the stroke amount is detected through measurement of the pressure and temperature of the outer air spring chamber having a greater volume than an inner air spring chamber. Accordingly, the precision of stroke detection is low. That is, the volume of the outer air spring chamber is larger than that of the inner air spring chamber, and hence the volume change that arises through advance and retreat of the piston that modifies the volume of the inner air spring chamber and the outer air spring chamber is relatively small. Therefore, pressure fluctuations are small, and the pressure and temperature changes measured by the sensors are likewise small. It is thus found that detection precision of the stroke amount is not very good. Further, pressure and temperature are measured in only one spring chamber. This was problematic in that, as a result, it was not possible to detect pressure leaks (air leaks) between the inner air spring chamber and the outer air spring chamber, or between the outer air spring chamber and outside air, and it was not possible to detect immediately the occurrence of anomalies in the air tightness of the outer air spring chamber and the inner air spring chamber. The pressure detector and the temperature detector being configured in the form of one set alone was a further drawback, since in that case the stroke amount cannot be detected if one of the detectors malfunctions.

SUMMARY OF THE INVENTION

In the light of the above issues, it is an object of the present invention to provide a front fork in which the stroke amount of a spring leg, of the front fork, that relies on an air spring, can be detected with good precision, and in which air leaks in the spring leg can likewise be detected.

In order to solve the above problem, a front fork is provided comprising:

a spring leg formed including an air spring and a damper leg having a damper built therein, which are disposed parallel to each other, the spring leg including a vehicle body-side tube, which is fixed to a vehicle body side and whose one end is plugged, and an axle-side tube, to which an axle is mounted and whose one end is plugged, an inner periphery space being formed by mutual insertion of the vehicle body-side tube and the axle-side tube;

a cylindrical guide cylinder that is disposed in the inner periphery space, and that is extended from the plugged end of one of the vehicle body-side tube and the axle-side tube to the inner periphery space;

a piston that is mounted to a leading end of a guide rod that extends from the plugged end of the other one of the tubes, and that slides over an inner peripheral face of the guide cylinder;

an inner air spring chamber that is partitioned by the piston in the interior of the guide cylinder;

an outer air spring chamber that is partitioned, outward of the inner air spring chamber, in the interior of the vehicle body-side tube and axle-side tube;

a first detector for detecting pressure and temperature in the outer air spring chamber;

a second detector for detecting pressure and temperature in the inner air spring chamber; and a stroke detection compensator for detecting a stroke amount of the spring leg, while compensating for the influence on pressure as a result of temperature changes in the inner air spring chamber and outer air spring chamber, on the basis of outputs of the first and second detector.

The present invention is explained based on embodiments of the invention, but the embodiments do not limit in any way the invention according to the scope of the appended claims. Also, not all combinations of features explained in the embodiments are essential for solving the problem of the present invention. The features thus encompass configurations that can be selectively adopted.

DESCRIPTION OF THE PREFERRED EMBODIMENTS

Embodiments

Figure 1:
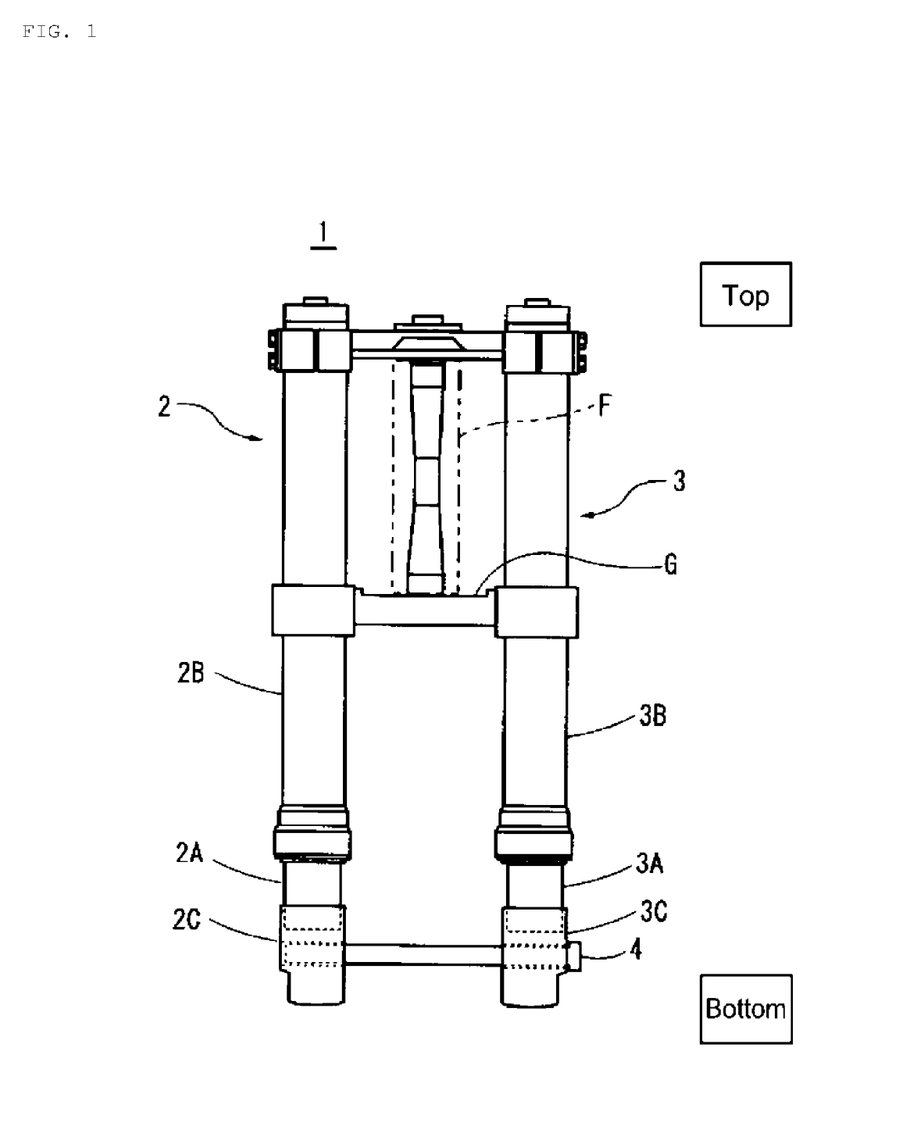
FIG. 1 is a schematic diagram of a front fork according to an exemplary embodiment.

FIG. 1 is an external-view diagram of an exemplary embodiment of a front fork according to the present invention.

As illustrated in FIG. 1, a front suspension 1 is made up of a pair of front forks, left and right. One of the front forks comprises a spring leg 2 having an air spring mechanism for supporting a vehicle body, and the other front fork comprises a damper leg 3 having a damping mechanism that dampens vibration arising from the operation of the spring leg 2. The left and right front forks are thus configured to have dissimilar functions. The spring leg 2 and the damper leg 3 are fixed to a frame F denoted by a virtual line (two-dot chain line), in such a manner that the spring leg 2 and the damper leg 3 are parallel to each other, by way of a fixture G, called a triple prong, that enables steering of a wheel.

That is, the front forks according to the present invention are made up of the damper leg 3, having, in the fork, no built-in damper function that is integrated with a spring function of the vehicle body by a metal spring, as is the case in conventional instances, and of the spring leg 2 having no built-in damper function, and comprising an air spring instead of a metal spring.

In the present embodiment, the tubes positioned on the axle side of the spring leg 2 and the damper leg 3 are referred to as axle-side tubes 2A, 3A, and the tubes fixed to the vehicle body side are referred to as vehicle body-side tubes 2B, 3B. In the explanation below, the vehicle body side is upper side and the axle side is the lower side.

The spring leg 2 and the damper leg 3 are made up of the axle-side tubes 2A, 3A and the vehicle body-side tubes 2B, 3B, respectively, and are provided with axle mounting sections 2C, 3C by way of which the axle is mounted to the lower ends of the axle-side tubes 2A, 3A. A wheel is disposed between the axle mounting section 3C of the damper leg 3 and the axle mounting section 2C of the spring leg 2. The axle 4 runs through the axle mounting sections 2C, 3C and the wheel, so that the wheel is rotatably fixed.

Figure 2:
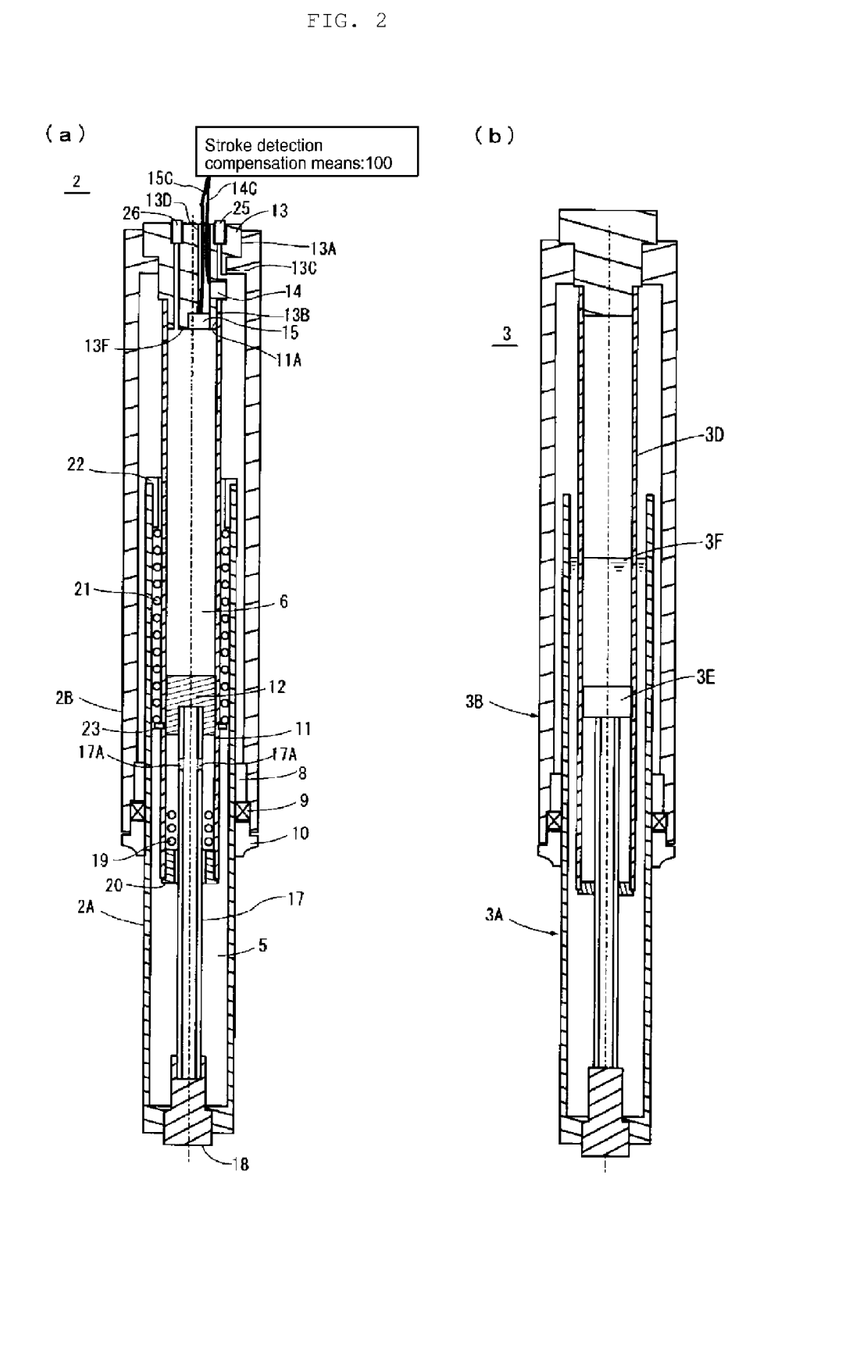
FIG. 2 is a configuration diagram of the front fork according to the embodiment.

As illustrated in FIG. 2B, the damper leg 3 has a damper function alone, and has no built-in spring function of supporting the vehicle body by way of a metal spring, as in conventional instances. In the damper leg 3, a damping mechanism is configured by way of the cylinder 3D that extends from the vehicle body-side tube 3B in such a way so as to be immersed in fork oil 3F, a specific amount of which fills the interior of the axle-side tube 3A, such that fork oil 3F flows through an orifice that is formed in a piston 3E that is fixed to the axle-side tube 3A.

As illustrated in FIG. 2A, the spring leg 2 is made up of the axle-side tube 2A and the vehicle body-side tube 2B that are provided so as to be capable of sliding with respect to each other. An outer air spring chamber 5 and an inner air spring chamber 6 that constitute an air spring mechanism are provided in the interior of the spring leg 2.

The outer air spring chamber 5 is formed by a space that communicates the inner space of the axle-side tube 2A and the inner space of the vehicle body-side tube 2B. Specifically, the outer air spring chamber 5 is a space formed in such a manner that at the outer periphery of the axle-side tube 2A, a space between the vehicle body-side tube 2B and the axle-side tube 2A is slidingly sealed by a sliding member 8, referred to as a slide metal, an oil seal 9, and a dust seal 10 that are provided in the opening end side inner periphery of the vehicle body-side tube 2B.

The sliding member 8 comprises a cylinder, having a specific wall thickness, that fits into a recess that is provided in the inner periphery of the opening end side of the vehicle body-side tube 2B. The sliding member 8 slidably supports the axle-side tube 2A with respect to the vehicle body-side tube 2B. The oil seal 9 is provided on the vehicle body-side tube 2B, further to the opening end side of the latter than the sliding member 8. The oil seal 9 blocks pressure leaks from the outer air spring chamber 5 towards outside air by further sealing the gap between the inner periphery of the vehicle body-side tube 2B and the outer periphery of the axle-side tube 2A. The dust seal 10, which protects the oil seal 9 against intrusion of foreign matter from the outer environment, is provided on the vehicle body-side tube 2B, further towards the end section than the oil seal 9.

Outer air spring chamber 5 that communicates the inner space of the axle-side tube 2A and the inner space of the vehicle body-side tube 2B is formed by sealing of the inner periphery space of the vehicle body-side tube 2B and the outer periphery space of the axle-side tube 2A by way of the sliding member 8 and the oil seal 9.

The inner air spring chamber 6 is made up of a guide cylinder 11 that is provided in the vehicle body-side tube 2B, and by a piston 12 that is mounted to the axle-side tube.

The guide cylinder 11 is a cylinder having a smaller diameter than the inner diameter of the axle-side tube 2A. The guide cylinder 11, which is provided with a threaded section 11A on the inner periphery of one end side, is screwed to a cap bolt 13 that plugs the end section of the vehicle body-side tube 2B; as a result, the guide cylinder 11 becomes fixed to the plugged end side that is coaxial with the axis of the vehicle body-side tube 2B.

Figure 3:
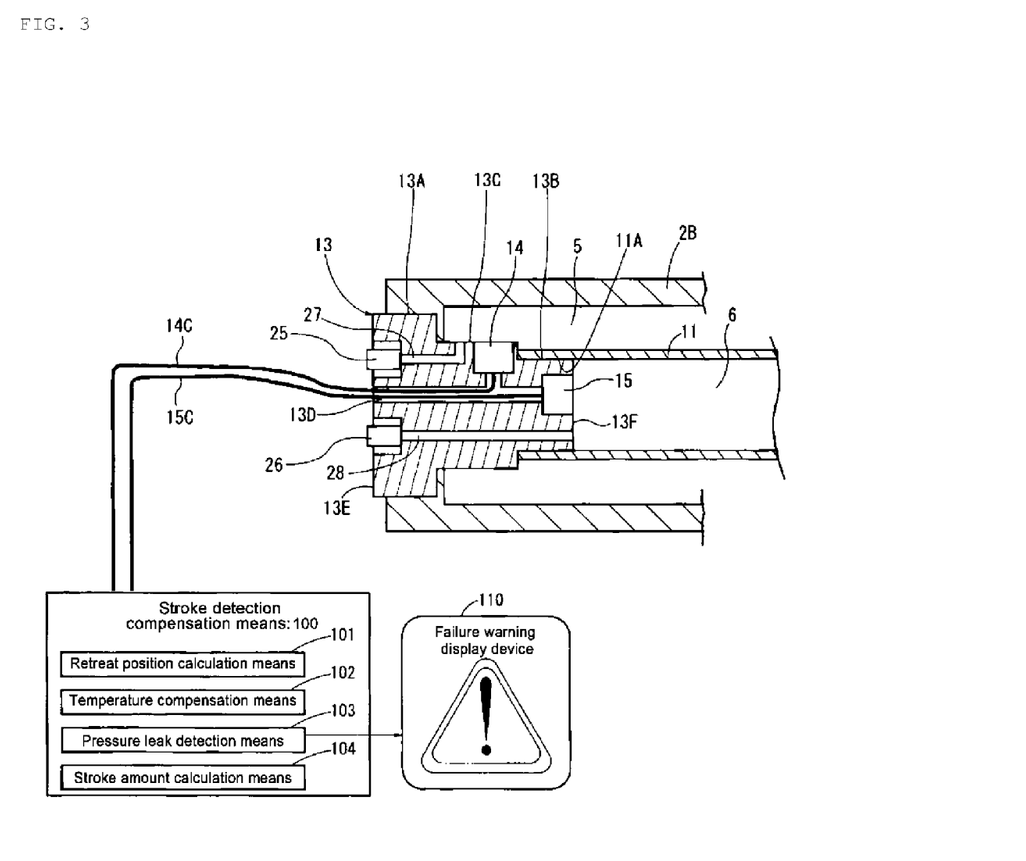
FIG. 3 is a partial enlarged diagram of a spring leg according to the embodiment.

The cap bolt 13 is a stepped threaded body, shaped in the form of steps as that are a stack of cylinders of dissimilar outer shape, as illustrated in the enlarged diagram of FIG. 3. The cap bolt 13 comprises a large-diameter threaded section 13A that is screwed to the vehicle body-side tube 2B, a small-diameter threaded section 13B that is screwed to the guide cylinder 11, and an end face abutting section 13C with which the end face of the guide cylinder 11 comes into contact. The end face abutting section 13C, which is formed between the large-diameter threaded section 13A and the small-diameter threaded section 13B, is formed to have a larger diameter than the outer diameter of the guide cylinder 11, such that the end face abutting section 13C projects into the inner space of the vehicle body-side tube 2B together with the small-diameter threaded section 13B. The outer peripheral face of the end face abutting section 13C is formed as a straight surface that has not been worked through threading or the like.

Therefore, the guide cylinder 11 is positioned in the middle of the inner space of the vehicle body-side tube 2B through screwing of the large-diameter threaded section 13A of the cap bolt 13 to the vehicle body-side tube 2B and through screwing of the small-diameter threaded section 13B of the cap bolt 13 to the threaded section 11A of the guide cylinder 11. One end of the guide cylinder 11 becomes plugged by abutting, against the end face abutting section 13C, the end face of the guide cylinder 11 that is screwed to the small-diameter threaded section 13B.

The cap bolt 13 has an outer air pressure adjustment section 25 that adjusts the air pressure in the outer air spring chamber 5, an inner air pressure adjustment section 26 that adjusts the air pressure in the inner air spring chamber 6, first detector 14 comprising a pressure sensor and a temperature sensor for detecting the pressure and temperature of the outer air spring chamber 5, and second detector 15 comprising a pressure sensor and a temperature sensor for detecting the pressure and temperature of the inner air spring chamber 6.

The outer air pressure adjustment section 25 and the inner air pressure adjustment section 26 are valves, exposed at an outer end face 13E of the cap bolt 13, that enable inflow and outflow of air between the exterior and the interior of the outer air spring chamber 5 and of the inner air spring chamber 6.

The outer air pressure adjustment section 25 runs through the outer peripheral face of the end face abutting section 13C of the cap bolt 13, and is connected by a communicating hole 27 that extends up to the outer air pressure adjustment section 25 and that communicates the outer air pressure adjustment section 25 with the outer air spring chamber 5.

The inner air pressure adjustment section 26 runs through an inner end face 13F of the cap bolt 13, and is connected by a communicating hole 28 that extends up to the inner air pressure adjustment section 26 and that communicates the inner air pressure adjustment section 26 with the inner air spring chamber 6.

The air pressure in the outer air spring chamber 5 and the inner air spring chamber 6 is adjusted, by the outer air pressure adjustment section 25 and the inner air pressure adjustment section 26, when, for instance, the front fork is longest (full extension state), i.e. when the volume of the outer air spring chamber 5 and the inner air spring chamber 6 is largest. In the present embodiment, the pressure-receiving area (cross-sectional area for supporting the stroke-derived load) of the inner air spring chamber 6 that receives the load that accompanies the stroke of the spring leg 2 is set to be smaller than the pressure-receiving area of the outer air spring chamber 5. With the front fork in a fully extended state, the air pressure in the inner air spring chamber 6 is adjusted, by way of the outer air pressure adjustment section 25 and the inner air pressure adjustment section 26, so as to be higher, by a specific pressure difference, than the air pressure in the outer air spring chamber 5. In the present embodiment, the pressure that acts on the outer air spring chamber 5 and the pressure that acts on the inner air spring chamber 6, when the front fork is retracted, are dissimilar. Therefore, a reaction force such as the one illustrated in FIG. 4 can be obtained by setting the air pressure in the inner air spring chamber 6 to be greater than the air pressure in the outer air spring chamber 5. The pressure-receiving area of the outer air spring chamber 5 is greater than the pressure-receiving area of the inner air spring chamber 6. Therefore, in a case where, the air pressure in the outer air spring chamber 5 and the air pressure in the inner air spring chamber 6 are set to a same pressure, the air spring force that acts on the outer air spring chamber 5 is larger than the air spring force that acts on the inner air spring chamber 6. Accordingly, the front fork hardens, and no stroke occurs, even if the front fork is at its longest (full extension state). Therefore, a sufficient stroke amount can be achieved by setting beforehand the air pressure in the outer air spring chamber 5 to be smaller than the air pressure in the inner air spring chamber 6.

The first detector 14, which is provided so as to be exposed at the outer peripheral face of the end face abutting section 13C of the cap bolt 13, detects the temperature and pressure in the outer air spring chamber 5. The second detector 15, which is provided so as to be exposed at the inner end face 13F of the cap bolt 13, detects the temperature and pressure in the inner air spring chamber 6. Signal input-output wirings 14C, 15C that extend from the first detector 14 and the second detector 15 are led out of the cap bolt 13 by way of a wiring lead-out hole 13D that is formed in the cap bolt 13. The signal input-output wirings 14C, 15C are connected to below-described stroke detection compensator 100, such that the pressure and the temperature detected by the first and second detector 14, 15 are outputted to the stroke detection compensator 100.

Specifically, the spring leg 2 has, in the interior thereof, the inner air pressure adjustment section 26 for adjusting the air pressure in the inner air spring chamber 6, and the second detector 15 for measuring the pressure and temperature of the inner air spring chamber 6, and has also the outer air pressure adjustment section 25 for adjusting the air pressure in the outer air spring chamber 5, and the first detector 14 for measuring the pressure and temperature of the outer air spring chamber 5.

Returning to FIG. 2A, the piston 12 is a circular column that is mounted on the leading end of a guide rod 17 that extends from the plugged end of the axle-side tube 2A, such that the piston 12 slides along the interior of the guide cylinder 11. The guide rod 17 comprises a cylindrical hollow pipe. A threaded section that is formed on the end section outer peripheral face of the guide rod 17, at the opposite end section at which the piston 12 is mounted, is screwed onto a bottom bolt 18 for plugging the end section of the axle-side tube 2A. The guide rod 17 becomes fixed thereby to the plugged end side of the axle-side tube 2A. The guide rod 17 is also provided with a through-hole 17A that runs through the inner peripheral face and the outer peripheral face of the guide rod 17, and that communicates the hollow space of the guide rod 17 with the inner periphery space of the guide cylinder 11. As a result, the air spring effect elicited by the spring leg 2 is enhanced through an increase in the capacity of the interior of the outer air spring chamber 5 in the spring leg 2. The length of the guide rod 17 is set in such a manner that the piston 12 does not jut out of the guide cylinder 11 when the spring leg 2 is longest, and in such a manner that the piston 12 does not hit the cap bolt 13 when the spring leg 2 is shortest.

A rebound spring 19 is disposed between the guide rod 17 and the guide cylinder 11 in a state where the piston 12 is disposed in the guide cylinder 11. The rebound spring 19 is disposed in such a manner so as to surround the outer periphery of the guide rod 17 between the piston 12 and a ring-like spring stop member 20 that is provided in the opening end side of the guide cylinder 11. Accordingly, the rebound spring 19 constitutes a buffering fixture that prevents the piston 12 from hitting the spring stop member 20 when the spring leg 2 is longest. The spring stop member 20 is a guide member that is fitted or screwed to the end section of the guide cylinder 11 and that supports the sliding of the guide rod 17.

A balance spring 21 is disposed between the guide cylinder 11 and the axle-side tube 2A. The balance spring 21, which is a spring made up of a metal and formed to a coil shape, is interposed between a spring receiver 23 that is provided in the outer periphery of the guide cylinder 11 and a spring stop member 22 that is screwed to the end section of the axle-side tube 2A, outside the guide cylinder 11. The balance spring 21 acts to retract the vehicle body-side tube 2B and the axle-side tube 2A against the spring force of the air spring of the outer air spring chamber 5 and the air spring of the inner air spring chamber 6. Specifically, the balance spring 21 is disposed to surround the guide cylinder 11 between the ring-like spring stop member 22 that is provided at the opening end of the axle-side tube 2A, and the spring receiver 23 that is provided at an intermediate portion in the outer periphery of the guide cylinder. The purpose of the balance spring 21 is to curtail sudden extension of the axle-side tube 2A on account of the momentum that arises when the axle-side tube 2A is pushed back by the reaction force of air that is compressed in the outer air spring chamber 5 and the inner air spring chamber 6 when the spring leg 2 retracts.

Therefore, the outer air spring chamber 5 is formed by a space into which the vehicle body-side tube 2B and the axle-side tube 2A are partitioned, outward of at least the inner air spring chamber 6, in the guide cylinder 11, such that the outer air spring chamber 5 functions as an air spring through changes in volume that arise in that space when the axle-side tube 2A moves with respect to the vehicle body-side tube 2B. The change in volume in the outer air spring chamber 5 arising from the stroke of the spring leg 2 is detected on the basis of the pressure and temperature, in that space, by the first detector 14.

The inner air spring chamber 6 functions as an air spring through changes in the volume that is surrounded by the inner peripheral face of the guide cylinder 11, the piston 12 and the cap bolt 13, upon displacement, within the guide cylinder 11 of the vehicle body-side tube 2B, of the piston 12 that is fixed to the axle-side tube 2A, in response to displacement of the axle-side tube 2A with respect to the vehicle body-side tube 2B. Changes in volume of the inner air spring chamber 6 during a stroke of the spring leg 2 are detected, on the basis of the pressure and temperature in the space, by the second detector 15.

As FIG. 3 shows, the stroke detection compensator 100 is a so-called computer that is provided with a CPU as computing means, a ROM and a RAM as storage means, and an I/O interface as communications means. The storage means stores a processing program for detecting a stroke amount. For instance, the storage means stores a data map for calculating a stroke amount on the basis of detected pressure and temperature. The stroke amount can be easily detected with good precision thereby.

The stroke detection compensator 100 comprises an advance-retreat position calculator 101, temperature compensator 102, pressure leak detector 103 and stroke amount calculator 104.

The advance-retreat position calculator 101 calculates an advance-retreat position for each of the outer air spring chamber 5 and the inner air spring chamber 6. The advance-retreat position calculator 101 calculates the advance-retreat position from a reference position of the axle-side tube 2A with respect to the vehicle body-side tube 2B, on the basis of the pressure detected by the pressure sensor of the first detector 14, and calculates the advance-retreat position from a reference position of the piston 12 with respect to the guide cylinder 11 on the basis of the pressure detected by the pressure sensor of the second detector 15. For instance, zero is set as the reference position when the front fork is longest (full extension state); as a result, the volume of the outer air spring chamber 5 and the inner air spring chamber 6 becomes largest, and the pressure value measured by the pressure sensors of the first detector 14 and the second detector 15 is detected only as a positive value. The stroke amount can therefore be easily detected. As regards the reference position, the position at a time where the vehicle is in a 1G state, i.e. when a person riding the vehicle has a weight as is set in the design stage, may be set to stroke amount zero. Alternatively, the position at a time where the vehicle is empty may be set to zero.

The temperature compensator 102 is means for compensating for the change in pressure, in the outer air spring chamber 5 and the inner air spring chamber 6, that results from temperature changes at a time when rises or drops from the reference temperature in the outer air spring chamber 5 and inner air spring chamber 6, as detected by the temperature sensor of the first detector 14 and the temperature sensor of the second detector 15.

For instance, when the temperature of the outer air spring chamber 5 and the inner air spring chamber 6 rises from the reference temperature, the pressure values measured by the pressure sensors of the first and second detector 14, 15 result from adding the change in pressure caused by changes in temperature in the outer air spring chamber 5 and the inner air spring chamber 6, as a result of the operation of the spring leg 2, to the change in load that actually acts on the suspension, i.e. the change in pressure caused by changes in volume of the outer air spring chamber 5 and the inner air spring chamber 6 as a result of the stroke of the spring leg 2. That is, the pressure measured by the pressure sensors of the first and second detector 14, 15 are outputted as larger or smaller, and hence the temperature compensator 102 corrects the changes in pressure value that accompany temperature changes of air in the outer air spring chamber 5 and the inner air spring chamber 6.

Examples of methods for implementing temperature compensation include, for instance, a method wherein the expansion rate and contraction rate that accompany temperature changes at times where the temperature rises or drops from a reference temperature are worked out beforehand and stored in the temperature compensator 102, and the pressure value that arises on account of temperature changes is calculated from the expansion rate and the contraction rate, and the pressure value derived temperature changes is subtracted from the pressure values that are measured by the pressure sensors, to detect the stroke amount as a result.

The pressure leak detector 103 works out an increase or decrease value that is a difference in pressure values detected by the pressure sensor of the first detector 14 and the pressure sensor of the second detector 15 with respect to the set reference pressure value as a reference value, such that the pressure leak detector 103 detects that a pressure leak has occurred when the increase or decrease value is greater than a specific threshold value set beforehand.

Specifically, a pressure leak is detected to have occurred between the outer air spring chamber 5 and outside air when the increase or decrease value of the pressure value detected by the second detector 15 with respect to the set reference pressure value in the inner air spring chamber 6 is equal to or smaller than a threshold value, and the increase or decrease value of the pressure value detected by the first detector 14 with respect to the set reference pressure value in the outer air spring chamber 5 is equal to or greater than a threshold value. A pressure leak is detected to have occurred between the outer air spring chamber 5 and the inner air spring chamber 6 when the increase or decrease value of the pressure value detected by the second detector 15 with respect to the set reference pressure value in the inner air spring chamber 6 is equal to or greater than the threshold value, and the increase or decrease value of the pressure value detected by the first detector 14 with respect to the set reference pressure value in the outer air spring chamber 5 is equal to or greater than the threshold value. As regards detected pressure leaks, the failure warning display device 110, as a failure alarm, is connected to the stroke detection compensator 100, so that, as a result, it becomes possible to immediately notify, to the rider, the occurrence of an anomaly such as a pressure leak or the like in the outer air spring chamber 5 and the inner air spring chamber 6 of the spring leg 2. For instance, the failure warning display device 110 may be a simplified display device that lights up with a warning light when an anomaly such as a pressure leak or the like occurs in either from among the outer air spring chamber 5 and the inner air spring chamber 6 of the spring leg 2; alternatively, the failure warning display device 110 may be a display device that displays in detail each site at which a pressure leak has occurred.

Another method for detecting pressure leaks may involve comparing pressure values detected by the pressure sensor of the first detector 14 and the pressure sensor of the second detector 15, and detecting that a pressure leak has occurred between the outer air spring chamber 5 and the inner air spring chamber 6 if the pressure values are identical.

The stroke amount calculator 104 calculates, and outputs, a stroke amount in accordance with an actual load value that acts on the suspension, on the basis of the position and pressure value calculated by the advance-retreat position calculator 101 and the temperature compensator 102.

As a result, it becomes possible to calculate an accurate stroke amount according to the load that acts on the suspension during travel. For instance, an air inflow-outflow device, not shown, that enables inflow and outflow of air into and out of the outer air spring chamber 5 and the inner air spring chamber 6, may be connected to the outer air pressure adjustment section 25 and the inner air pressure adjustment section 26, so that, as a result, the air pressure in the outer air spring chamber 5 and the inner air spring chamber 6 is adjusted, on the basis of the calculated stroke amount, through inflow or outflow of air by way of the outer air pressure adjustment section 25 and the inner air pressure adjustment section 26. Stable travel of the motorcycle can be controlled as a result.

Figure 4:
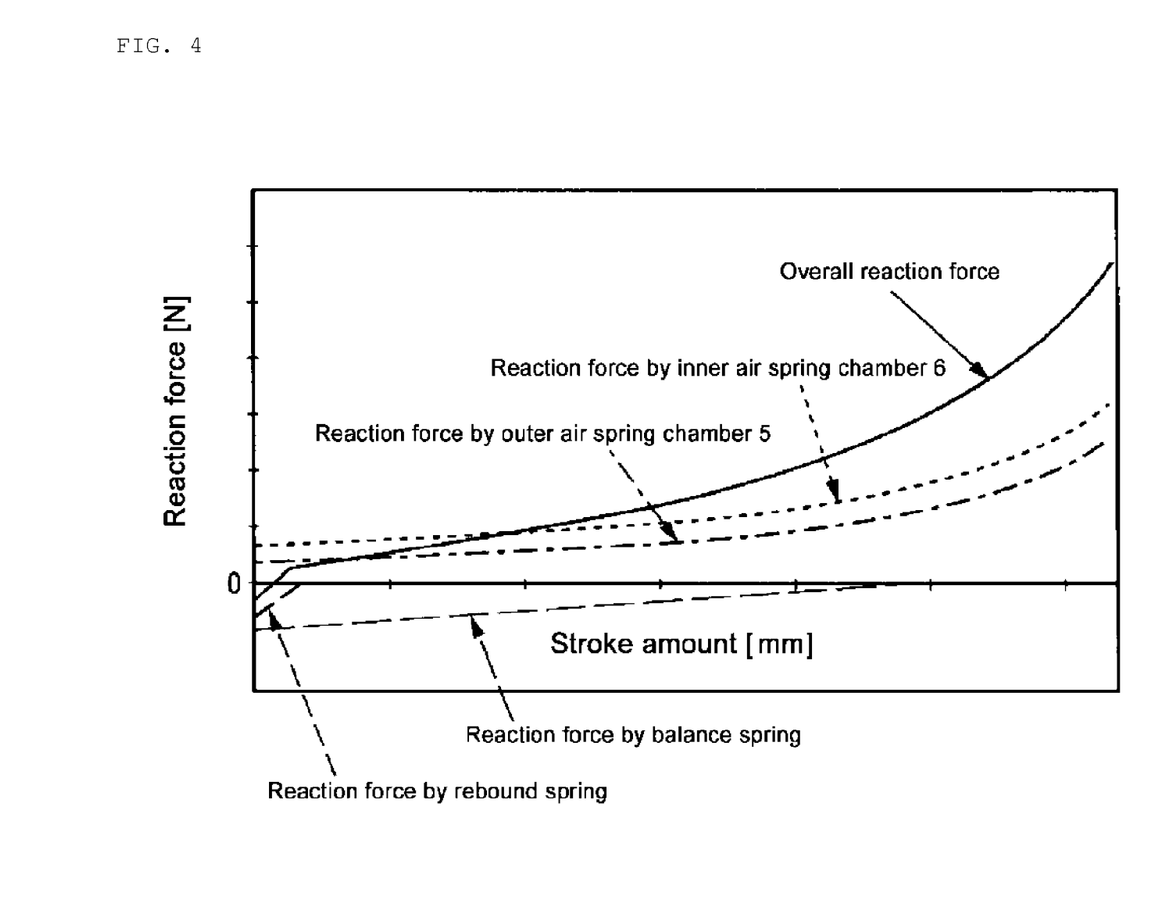
FIG. 4 is a graph illustrating reaction forces with respect to stroke amount of the spring leg according to the embodiment.

The outer air spring chamber 5 and the inner air spring chamber 6 of the spring leg 2 according to the present embodiment exhibit reaction force characteristics such as those illustrated in FIG. 4 with respect to stroke amount. The air pressure in the inner air spring chamber 6 having a smaller pressure-receiving area than the pressure-receiving area of the outer air spring chamber 5 is set to be high; as a result, it becomes possible to improve suspension start-off while maintaining the initial reaction force of the stroke from the time of full extension of the front fork. The outer air spring chamber 5, where pressure is set to be lower than the air pressure in the inner air spring chamber 6, can operate in such a manner so as to elicit an auxiliary reaction force, from about the middle of the stroke to the back of the stroke (shortest stroke). Therefore, the pressure in the inner air spring chamber 6, where the air pressure value is high, is detected by the pressure sensor of the second detector 15, and the pressure detected by the pressure sensor is corrected on the basis of the temperature detected by the temperature sensor of the second detector 15. The stroke amount can be detected as a result with good precision.

The pressure and temperature in the outer air spring chamber 5 and the inner air spring chamber 6 are detected individually by the first and second detector 14, 15. As a result, it becomes possible to detect pressure leaks between the outer air spring chamber 5 and the inner air spring chamber 6, and between the outer air spring chamber 5 and outside air, to detect immediately malfunction of the spring leg 2, and to afford safe running of the motorcycle.

Figure 5:
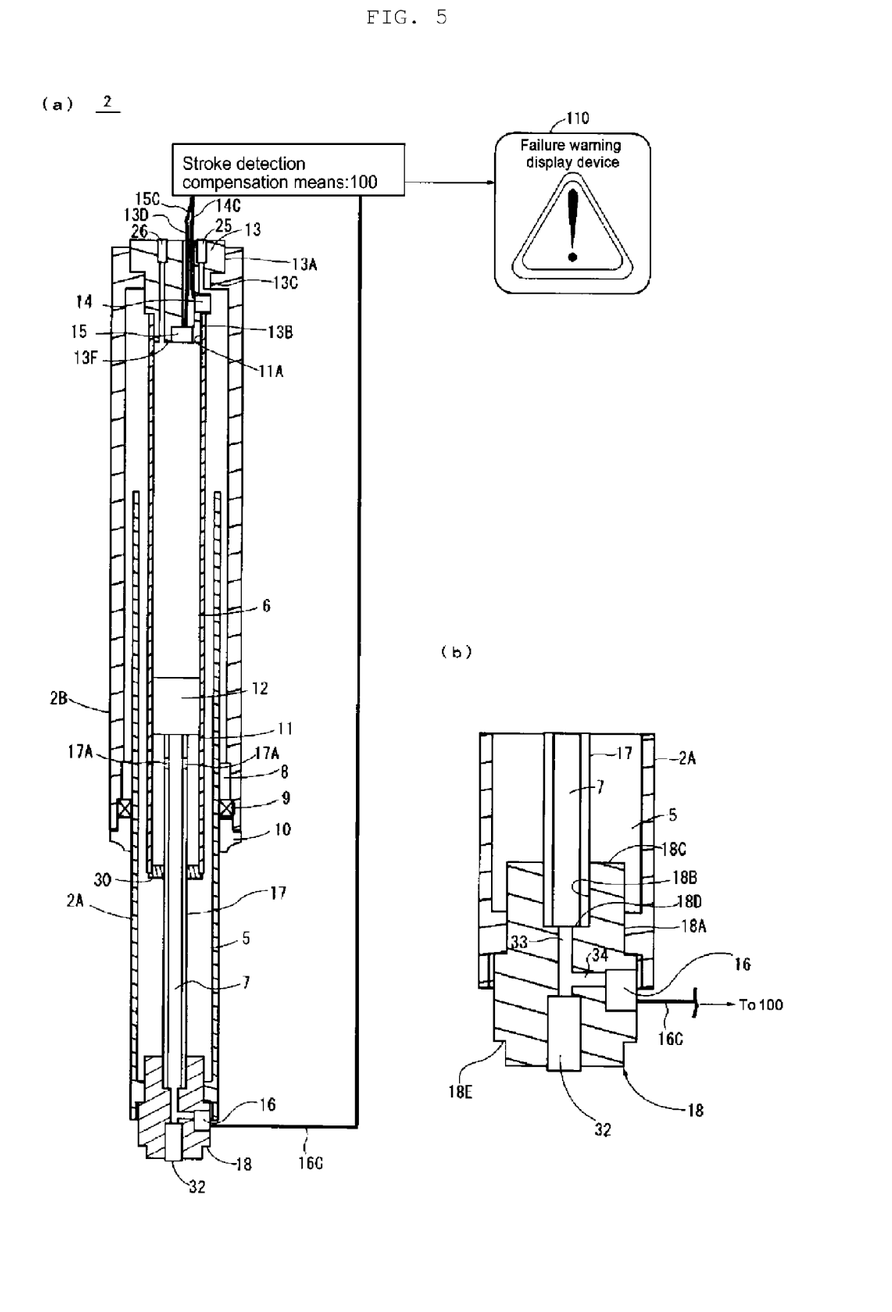
FIG. 5 is a configuration diagram of a spring leg according to another embodiment.
Figure 6:
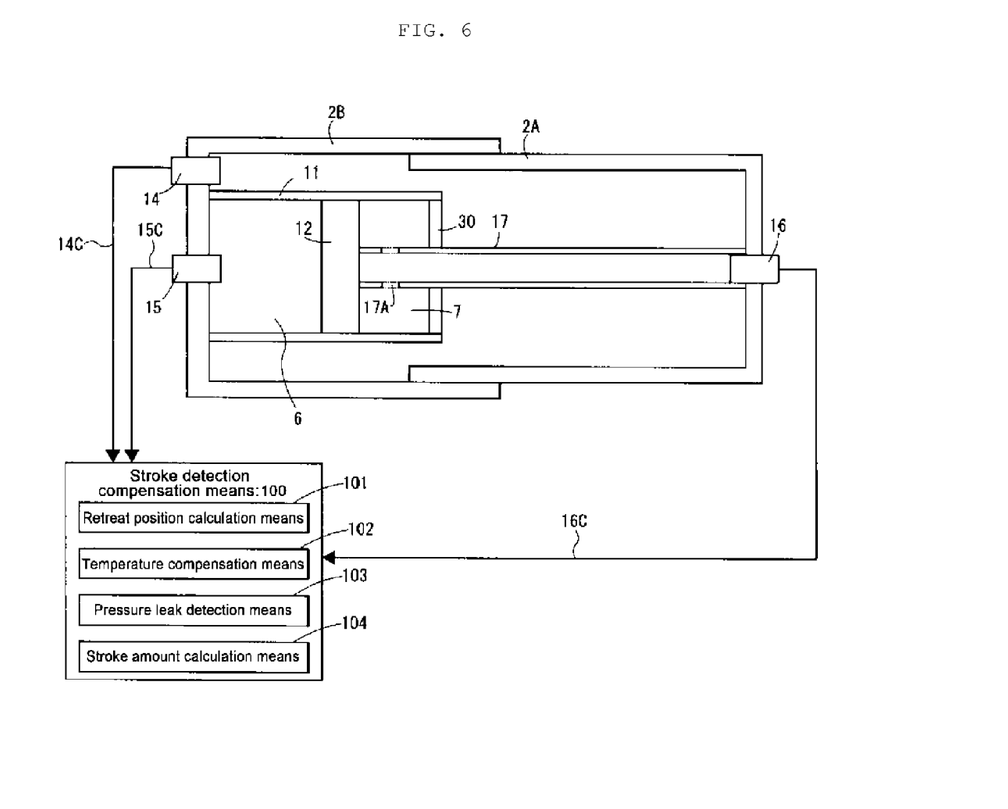
FIG. 6 is a block diagram of a spring leg according the other embodiment.

FIG. 5 illustrates the configuration of a spring leg 2 of an alternative embodiment, and FIG. 6 is a block diagram of the spring leg 2 of FIG. 5.

The spring leg 2 explained in the above embodiment comprises the mechanical balance spring 21 and rebound spring 19, as well as an air spring that comprises the outer air spring chamber 5 and the inner air spring chamber 6. However, as illustrated in FIG. 5, the spring leg 2 may be configured as comprising the air spring alone, without using a mechanical spring such as the balance spring 21 and the rebound spring 19. Such a configuration enables a weight reduction of the spring leg 2 and accordingly a reduction of the unsprung weight. As a result, it becomes possible to enhance conformability of the wheels to the road surface, and to enhance the functionality of the spring leg 2.

In a specific configuration, as illustrated in FIG. 5 and FIG. 6, the space between the outer peripheral face of the guide rod 17 and the inner peripheral face of the guide cylinder 11 is sealed, as an alternative to the spring stop member 20 that is provided at the opening end of the guide cylinder 11, and there is provided a rod guide 30 that supports the guide rod 17, such that a rebound air spring chamber 7 is made up of the piston 12, the rod guide 30 and the hollow space in the guide rod 17. The balance spring 21 and the rebound spring 19 are superseded thereby.

The volume of the rebound air spring chamber 7 increases when the spring leg 2 retracts and the piston 12 moves in such a manner that the volume in the inner air spring chamber 6 is smaller. As a result of this increase in volume, the pressure in the rebound air spring chamber 7 is brought to a reduced-pressure (negative pressure) state, from a reference pressure, and a force acts on the piston 12 urging the latter to return to the reference position.

Accordingly, the change in pressure (negative pressure) that occurs in the rebound air spring chamber 7 acts to conform to the force that compresses the inner air spring chamber 6, even under the action of a load such that the spring leg 2 is caused to retract suddenly. Therefore, it becomes possible to prevent sudden changes in stroke amount in the spring leg 2, and to elicit an effect similar to that of the balance spring 21, in the above-described embodiment.

Air in the rebound air spring chamber 7 is compressed when the spring leg 2 extends suddenly on account of the reaction force of the outer air spring chamber 5 and the inner air spring chamber 6 in a compressed state. As a result there is elicited the same effect as that of the rebound spring 19 of the above-described embodiment. In the explanation of the present embodiment as well, the volume of the inner air spring chamber 6 is smaller than the volume of the outer air spring chamber 5.

Third detector 16 for detecting the pressure and temperature of the rebound air spring chamber 7 is provided in the latter. Specifically, the third detector 16 is provided in the bottom bolt 18 that fixes the guide rod 17.

As illustrated in FIGS. 5A and 5B, the bottom bolt 18 comprises, as cylindrical threaded bodies, an outer threaded section 18A that is screwed onto the axle-side tube 2A, and an inner threaded section 18B that is screwed onto the guide rod 17. The outer threaded section 18A is a threaded section that is formed on the outer periphery of the bottom bolt 18, and that plugs the end section of the axle-side tube 2A by being screwed onto the threaded section of a bolt mounting hole that is formed on the end section of the axle-side tube 2A. The inner threaded section 18B is formed on the inner peripheral face of a hole that is provided along a bolt centerline, from substantially the center of a bolt end face 18C. The dimension of the inner threaded section 18B is large enough to enable screwing onto the threaded section that is formed on the end-section outer periphery of the guide rod 17.

The bottom bolt 18 is provided with a rebound air pressure adjustment section 32 that adjusts the air pressure in the rebound air spring chamber 7, and with third detector 16 that comprises a pressure sensor and a temperature sensor for detecting the pressure and temperature in the rebound air spring chamber 7.

The rebound air pressure adjustment section 32 is a valve, exposed at the end face 18E of the bottom bolt 18, on a tool engagement section side, that enables inflow and outflow of air between the exterior and the interior of the rebound air spring chamber 7. The rebound air pressure adjustment section 32 communicates with a through-hole 33 that runs through the inner threaded section 18B of the bottom bolt 18. The through-hole 33 communicates with the rebound air spring chamber 7 at a bottom section 18D of the inner threaded section 18B.

Adjustment of the air pressure in the rebound air spring chamber 7 by the rebound air pressure adjustment section 32 is performed simultaneously with the adjustment of the air pressure in the outer air spring chamber 5 and the inner air spring chamber 6 by the outer air pressure adjustment section 25 and the inner air pressure adjustment section 26. For instance, the adjustment is performed when the front fork is longest (full extension state), i.e. when the volume of the outer air spring chamber 5 and the inner air spring chamber 6 is largest and the volume of the rebound air spring chamber 7 is smallest. In the present embodiment, the pressure-receiving area of the inner air spring chamber 6 is set to be smaller than the pressure-receiving area of the outer air spring chamber 5, and is set so that, with the front fork in a fully extended state, the air pressure in the inner air spring chamber 6 is higher than the air pressure in the outer air spring chamber 5, and the air pressure in the rebound air spring chamber 7 is higher than the inner air spring chamber 6, by way of the outer air pressure adjustment section 25, the inner air pressure adjustment section 26 and the rebound air pressure adjustment section 32. As a result, it becomes possible to prevent the piston 12 from hitting the rod guide 30 when the spring leg 2 of the front fork is shortest. The pressure-receiving areas of the inner air spring chamber 6 and the rebound air spring chamber 7 are identical.

The third detector 16, which is provided exposed at the side face of the bottom bolt 18, detects the temperature and pressure in the rebound air spring chamber 7. The detection sections of the pressure sensor and temperature sensor in the third detector 16 are exposed at the communicating hole 34 that communicates with the through-hole 33. The pressure and temperature in the rebound air spring chamber 7 are detected thereby. Wiring 16C that extends from the third detector 16 is directly exposed from the bottom bolt 18, and is connected to the below-described stroke detection compensator 100. The pressure and temperature detected by the third detector 16 are outputted to the stroke detection compensator 100.

Figure 7:
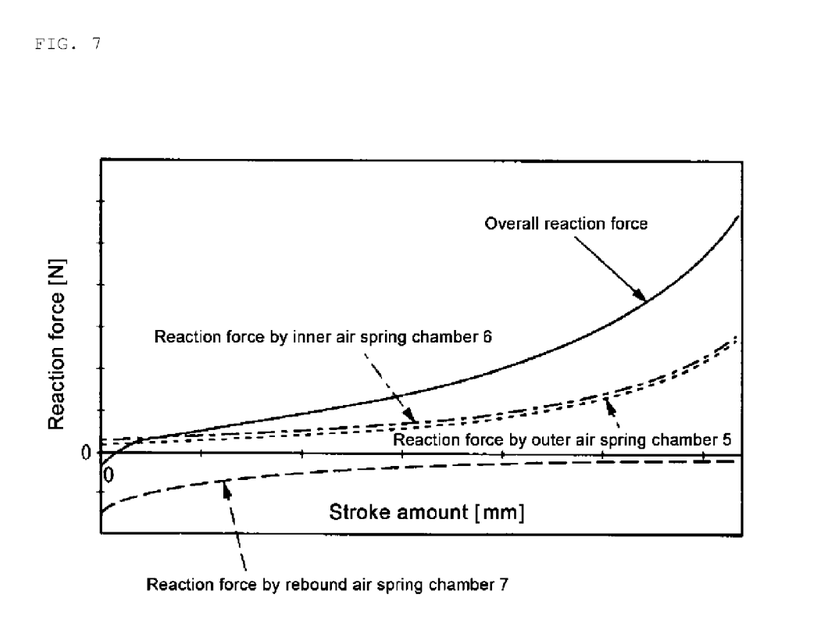
FIG. 7 is a graph illustrating reaction forces with respect to stroke amount of a spring leg according to the other embodiment.

The outer air spring chamber 5, the inner air spring chamber 6 and the rebound air spring chamber 7 in the spring leg 2 according to the present embodiment elicit reaction forces such as those illustrated in FIG. 7 with respect to the stroke amount. Specifically, the air pressure in the inner air spring chamber 6 having a smaller pressure-receiving area than the pressure-receiving area of the outer air spring chamber 5, is set to be high, and the air pressure in the rebound air spring chamber 7 is set to be higher than the air pressure in the inner air spring chamber 6 at the time where the volume of the inner air spring chamber 6 is largest and the volume of the rebound air spring chamber 7 is smallest; as a result, it becomes possible to improve suspension start-off while maintaining the initial reaction force of the stroke from the time of full extension of the front fork. The outer air spring chamber 5, in which pressure is set to be lower than the air pressure in the inner air spring chamber 6 and in the rebound air spring chamber 7, can operate in such a manner so as to elicit an auxiliary reaction force, from about the middle of the stroke to the back of the stroke (shortest stroke). Therefore, the air pressure in the inner air spring chamber 6 and the rebound air spring chamber 7, where air pressure is set to be high, is detected by the pressure sensor of the second detector 15 and the pressure sensor of the third detector 16, and the pressures detected by the pressure sensors are corrected on the basis of the temperature detected by the temperature sensor of the second detector 15 and the temperature sensor of the third detector 16. Thereby, stroke amount can be detected with good precision.

Even for a small change in the stroke amount, the change in pressure in the inner air spring chamber 6 and the rebound air spring chamber 7, where the initial pressure value whereof is set to be high, manifests itself more pronouncedly than the change in pressure in the outer air spring chamber 6. Accordingly, the stroke amount can be detected, with good precision, on the basis of the detected pressure, through detection of the pressure in the inner air spring chamber 6 by way of the second detector 15 and through detection of the pressure in the rebound air spring chamber 7 by way of the third detector 16.

In the spring leg 2 according to the present invention, the initial sealing pressure of air is high, and pressure fluctuation accompanying changes in the stroke amount are substantial. The pressure in the inner air spring chamber 6 and the rebound air spring chamber 7 is detected by the respective pressure sensors of the second detector 15 and the third detector 16, and the pressure detected by the pressure sensors is corrected on the basis of the temperature detected by the respective temperature sensors of the second detector 15 and the third detector 16. The stroke amount, having undergone temperature compensation, can be detected with good precision as a result.

The first, second and third detector 14, 15, 16 that detect pressure and temperature are individually provided in the outer air spring chamber 5, the inner air spring chamber 6 and the rebound air spring chamber 7, respectively. Thereby, pressure leaks in the outer air spring chamber 5, the inner air spring chamber 6 and the rebound air spring chamber 7 can be detected through individual detection of the pressure and temperature in the outer air spring chamber 5, the inner air spring chamber 6 and the rebound air spring chamber 7.

The pressure leak detector 103 of the stroke amount detection compensator 100 detects an increase or decrease value that is a difference in pressure values detected by the pressure sensor of the first detector 14, the pressure sensor of the second detector 15 and the pressure sensor of the third detector 16, with respect to reference pressure values set as reference values of the outer air spring chamber 5, the inner air spring chamber 6 and the rebound air spring chamber 7, respectively. The pressure leak detector 103 can detect that a pressure leak has occurred when the increase or decrease value is greater than a specific threshold value set beforehand.

Specifically, a pressure leak can be detected to have occurred between the outer air spring chamber 5 and outside air when the increase or decrease value of the pressure value detected by the second detector 15 with respect to the set reference pressure value in the inner air spring chamber 6 does not exceed a threshold value, and the increase or decrease value of the pressure value detected by the first detector 14 with respect to the set reference pressure value in the outer air spring chamber 5 exceeds a threshold value; a pressure leak can be detected to have occurred between the outer air spring chamber 5 and the inner air spring chamber 6 when the increase or decrease value of the pressure value detected by the second detector 15 with respect to the set reference pressure value in the inner air spring chamber 6 exceeds a threshold value, and the increase or decrease value of the pressure value detected by the first detector 14 with respect to the set reference pressure value in the outer air spring chamber 5 exceeds a threshold value; a pressure leak can be detected to have occurred between the inner air spring chamber 6 and the rebound air spring chamber 7 when the increase or decrease value of the pressure value detected by the second detector 15 with respect to the set reference pressure value in the inner air spring chamber 6 exceeds a threshold value and the increase or decrease value of the pressure value detected by the third detector 16 with respect to the set reference pressure value in the rebound air spring chamber 7 exceeds a threshold value; a pressure leak can be detected to have occurred between the outer air spring chamber 5 and the rebound air spring chamber 7 when the increase or decrease value of the pressure value detected by the third detector 16 with respect to the set reference pressure value in the rebound air spring chamber 7 exceeds a threshold value and the increase or decrease value of the pressure value detected by the first detector 14 with respect to the set reference pressure value in the outer air spring chamber 5 exceeds a threshold value.

The pressure leaks detected by the pressure leak detector 103 can be displayed, for each site at which the pressure leak has occurred, by display means that is connected to the stroke detection compensator 100. As a result it becomes possible to immediately notify, to the rider, about the occurrence of an anomaly in the outer air spring chamber 5, the inner air spring chamber 6 and the rebound air spring chamber 7 of the spring leg 2, and to afford safe running of the motorcycle.

The inner air spring chamber 6 and the outer air spring chamber 5 are independent from each other. Therefore, the vehicle body can be supported by the reaction force of the inner air spring chamber 6, and low-speed travel is enabled, for a load corresponding to that of one occupant, even in a case of hypothetical pressure leak through loss of air pressure in the outer air spring chamber 5 caused by damage to the tubes on account of chipping (small scratches) due to a flying stone hitting the axle-side tube 2A.

In the above explanation, the detector 14 to 16 are provided for measuring individually the pressure and temperature inside the air spring chambers 5 to 7 that are provided in the spring leg 2, such that the stroke amount can be detected with high precision through detection of the actual stroke amount, by the stroke detection compensator 100, on the basis of the outputs of the detector 14 to 16. In particular, the detector 14, 15, 16 are provided in the air spring chambers 5, 6, 7, in which the compression ratio is high and pressure fluctuation is substantial in response to the stroke amount, such that the stroke can be detected with higher precision than in conventional instances, by virtue of a configuration wherein the stroke amount is detected on the basis of the pressure and temperature that are outputted by the detector 14, 15, 16. High-precision stroke detection, independent from the temperature of the air spring chambers 5 to 7, is made thus possible, since the temperature and the pressure in the air spring chambers 5 to 7 can be detected and temperature compensation can be performed for the detected pressure. Providing individually the detector 14 to 16 in the respective air spring chambers 5 to 7 makes it possible to detect pressure leaks in the partitioned air spring chambers 5 to 7, and to detect emergencies in the spring leg 2. The air spring chambers 5 to 7 are provided with the respective plurality of detector 14 to 16. Accordingly, even if any of the detector 14 to 16 are damaged, the stroke amount can still be detected, although with lower precision, by the undamaged detector. Fine control of the vehicle body attitude is made possible, on the basis of this high-precision detection of stroke amount, through connection of, for instance, an air pressure adjustment device to the air pressure adjustment sections 25, 26, 32.

Providing the detector 14 to 16 for detecting the stroke amount in the interior of the spring leg 2, as in the present embodiment, elicits the effect of reducing damage to the detector, and of facilitating the arrangement of the detectors 14 to 16. The pressure and temperature of air in the interior of the air spring chambers 5 to 7 is measured electrically by sensors, and the stroke amount is detected as a result. It becomes hence possible to detect the stroke amount easily and with good precision.

In the explanation of the embodiments above, the pressure-receiving area of the outer air spring chamber 5 that receives the load that accompanies the stroke of the spring leg 2 is set to be larger than the pressure-receiving area of the inner air spring chamber 6. However, the pressure-receiving areas of the outer air spring chamber 5 and the inner air spring chamber 6 may be identical; alternatively, the pressure-receiving area of the outer air spring chamber 5 may be set to be smaller than the pressure-receiving area of the inner air spring chamber 6.

In a case where the pressure-receiving areas of the outer air spring chamber 5 and the inner air spring chamber 6 are identical, it is sufficient to set an identical air pressure for the outer air spring chamber 5 and the inner air spring chamber 6 in an initial setting state (for example, in a completely stretched state). In such a case, a malfunction in the form of an anomaly of the spring leg 2 can be notified immediately, by the failure warning display device 110, if there arises a difference in the pressure values detected by the first detector 14 and the second detector 1. In a case where the pressure-receiving area of the outer air spring chamber 5 is smaller than the pressure-receiving area of the inner air spring chamber 6, the air spring force required in the spring leg 2 can be achieved through setting of the air pressure in the outer air spring chamber 5 to be higher than the air pressure in the inner air spring chamber 6.

In the explanation above, the air spring chambers 5, 6, 7 of the spring leg 2 have air sealed therein, but the gas is not limited to air, and may be nitrogen or the like.

In the explanation of the embodiments above, the spring leg 2 has the guide cylinder 11 provided in the vehicle body-side tube 2B, and the piston 12 provided in the axle-side tube 2A. However, the guide cylinder 11 may be provided in the axle-side tube 2A, and the piston 12 may be provided in the vehicle body-side tube 2B. The embodiments above have been explained by way of an example of an inverted suspension, but needless to say, the invention can be used in upright suspensions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the present invention include such modifications and variations as come with the scope of the appended claims and their equivalents.

What is claimed is:

1. A front fork for a motorcycle comprising:
   a spring leg including an air spring and a damper leg having a damper built therein, the spring leg and the damper leg being disposed parallel to each other,
   the spring leg including
   a first tube, which is fixed to a body side of the motorcycle and having one end that is plugged, and a second tube to which an axle of the motorcycle is fixed and having one end that is plugged, an inner periphery space being formed by inserting the second tube into the first tube;
   a cylindrical guide cylinder that is disposed in the inner periphery space, and that is extended from the plugged end of the first tube to the inner periphery space;
   a piston that is mounted to a leading end of a guide rod that extends from the plugged end of the second tube, and that slides over an inner peripheral face of the guide cylinder;
   an inner air spring chamber that is partitioned by the piston in an interior of the guide cylinder;
   an outer air spring chamber that is partitioned, outward of the inner air spring chamber, in an interior of the first tube and an interior of the second tube;
   a first detector for detecting pressure and temperature in the outer air spring chamber;
   a second detector for detecting pressure and temperature in the inner air spring chamber; and
   a stroke detection compensator for compensating for an influence on the pressure as a result of temperature changes in the inner air spring chamber and the outer air spring chamber and detecting a stroke amount of the spring leg, on the basis of detection results of the first detector and the second detector.

2. The front fork according to claim 1, wherein
   the spring leg further comprises: a rod guide in the guide cylinder, that supports the guide rod to which the piston is mounted;
   a rebound air spring chamber partitioned by the rod guide and the piston that is inserted in the guide cylinder; and
   a third detector for detecting pressure and temperature in the rebound air spring chamber, and wherein
   the stroke detection compensator detects the stroke amount of the spring leg on the basis of the pressures and temperatures that are outputted by the first, second and third detectors.

3. The front fork according to claim 1, wherein the stroke detection compensator has a failure alarm for indicating a malfunction of the spring leg.

4. The front fork according to claim 2, wherein the stroke detection compensator has a failure alarm for indicating a malfunction of the spring leg.

\* \* \* \* \*